(12) United States Patent
Shimizu et al.

(10) Patent No.: US 6,352,762 B1
(45) Date of Patent: Mar. 5, 2002

(54) EASILY ADHESIVE POLYAMIDE FILM

(75) Inventors: Shinji Shimizu, Shimomashiki-gun; Masahiro Yanagida, Yatsushiro; Makio Tominaga, Yatsushiro; Makoto Ichiki, Yatsushiro, all of (JP)

(73) Assignee: Kohjin Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/242,828

(22) PCT Filed: Jul. 2, 1998

(86) PCT No.: PCT/JP98/02973

§ 371 Date: Feb. 24, 1999

§ 102(e) Date: Feb. 24, 1999

(87) PCT Pub. No.: WO99/02341

PCT Pub. Date: Jan. 21, 1999

(30) Foreign Application Priority Data

Jul. 7, 1997 (JP) ............................................. 9-195220

(51) Int. Cl.[7] .......................... B32B 27/34; B32B 27/38; B32B 27/40
(52) U.S. Cl. ....................... 428/323; 428/331; 428/340; 428/355 N; 428/423.5; 428/424.2
(58) Field of Search ................................ 428/323, 331, 428/340, 341, 355 N, 423.5, 424.2; 524/507, 591, 377, 378; 523/402, 440, 443

(56) References Cited

U.S. PATENT DOCUMENTS

| | | | |
|---|---|---|---|
| 4,880,867 A | 11/1989 | Gobel et al. | 524/507 |
| 5,210,154 A | 5/1993 | Weidemeier et al. | 525/438 |
| 5,952,106 A * | 9/1999 | Schriver et al. | 428/423.5 |

FOREIGN PATENT DOCUMENTS

| | | |
|---|---|---|
| JP | A-57-26236 | 2/1982 |
| JP | A-61-287742 | 12/1986 |
| JP | A-1-244847 | 9/1989 |
| JP | A-3-55302 | 3/1991 |
| JP | A-8-258232 | 10/1996 |
| JP | B2-2576886 | 11/1996 |
| JP | A-9-123369 | 5/1997 |

* cited by examiner

Primary Examiner—D. S. Nakarani
(74) Attorney, Agent, or Firm—Oliff & Berridge, PLC

(57) ABSTRACT

An easily adhesive polyamide film has been created from unstretched or uniaxially stretched non-heated polyamide film coated with a water-base coating mixture, whose main constituents are (A) water polyurethane resin containing acetylene glycol in which each carbon atom immediately adjacent to the triple-bonded carbon atom is replaced with a hydroxyl group and a methyl group, and/or an ethylene oxide addition product of the acetylene glycol; (B) a water-soluble polyepoxy compound; and (C) particles with an average diameter between 0.001 and 1.0 μm, of which the solid-content weight ratio is 98–30/2–70/0.1–10, the coating amount after stretching is between 0.005 and 0.030 g/m², and the film is stretched in at least one direction and then heated. This newly invented film possesses good blocking resistance and excellent adhesiveness with print ink, laminate, and other coating mixtures, and is especially suitable for boiling sterilization, retort sterilization, and packaging of liquids.

7 Claims, No Drawings

EASILY ADHESIVE POLYAMIDE FILM

TECHNICAL FIELD

This invention relates to an easily adhesive film and in particular, to an easily adhesive polyamide film that possesses improved adhesiveness with print ink, for use in lamination with other films as well as other coating mixtures, especially under wet conditions. The film is suitable for boiling sterilization, retort sterilization, and packaging of liquid products.

PRIOR ART

Polyamide film offers good transparency, physical strength, chemical stability, machine workability, and gas protection ability, and is mainly used for packaging. However, it is normally used with surface treatment. Such treatment includes compounded processes such as printing, metal vapor deposition, lamination with other types of film, or coating. To improve adhesiveness, the film surface is conventionally treated by means of corona discharge, low-temperature plasma processes, flaming, or chrome nitrating.

Despite the use of such adhesiveness-improving processes, polyamide film suffers from insufficient adhesiveness for applications involving print ink, metal vapor deposition, lamination with other films, or use of other coating mixtures, especially under moistened conditions.

For example, in Japanese Patent Application Laid-open No. Hei 1-244847, a method is proposed in which adhesiveness between the print ink layer and the sealant layer is improved by forming a layer of improved adhesiveness of the surface of Biaxial Oriented PolyAmide film (hereafter BOPA) with a specified surface tension; however, the higher the BOPA's surface tension before creating this improved-adhesiveness layer, the weaker the film's adhesive strength under wetted conditions. In general, because BOPA's crystallinity increases under heat treatment after the film is stretched, polar groups such as NH, CO, OH group, are hydrically bonded among molecules in the resin. As a result there are fewer free polar groups at the film surface, which significantly affects adhesiveness with the improved-adhesiveness layer; also, surface tension declines. Consequently, with film having high crystallinity after heat treatment, it is not possible to obtain sufficient adhesiveness with the improved-adhesiveness layer. Particularly under moistened conditions, the finished film win have notably low adhesiveness. In addition, because the proposed method is an "off-line" one, in which the coating process is performed after biaxial orientation, production costs are high.

To solve these problems, the present inventors have proposed a measure (Japanese patent No. 2576886) that improves adhesiveness, especially under moistened conditions, by coating one side of the film with a water-soluble coating mixture whose main constituents are a water-soluble (metha) acrylic acid ester and water-soluble epoxy compound. The inventors achieved a polyamide film with improved adhesiveness by coating the film with the said water-soluble coating mixture, and then stretching, heating, and treating the surface Japanese Patent Application Laid-open No. Hei 8-258232.

Although these proposals significantly improved adhesiveness under moistened conditions, adhesiveness was not always sufficient when preparing packages from the compound film, or performing boiling sterilization or retort sterilization when food is packed. The latter two applications have posed particular difficulty.

Japanese Patent Application No. sho 57-26236 proposes a measure to create an easily adhesive polyester film by coating a polyester film that has not experienced crystal orientation with a composite made of polyurethane water dispersion solution and a nonion or anion surface active agent, then stretching the film. However, this measure creates spotted or whitened surface during vapor deposition due to the presence of a defoamant and surface active agent in the coating mixture. To solve this problem, Japanese Patent Application Laid-Open No. Hei 3-55302 proposes a plastic film with improved adhesiveness which is created without using defoamant or surface active agent.

However, producing water polyurethane resin without using defoamant and surface active agent is problematic. Foam, which is generated when ultimately eliminating organic solution after polymerizing water polyurethane resin in solvent, tends to create a thin paint film at the surface which comes in contact with air. This foam does not dissolve in water, and forms bubbles on the film surface. Also when no defoamant or surface active agent are used, i.e. during transportation, mixing coating, and the coating process, the water polyurethane absorbs air, generates foam, and forms bubbles, thus causing defects during printing and in the film's overall appearance.

DISCLOSURE OF THE INVENTION

As a result of examination to solve the above problems, the inventors found that it is possible to eliminate known difficulties from the mixing and coating processes, improve adhesiveness and ink printability, and significantly improve adhesiveness, especially under, wet conditions, for applications involving the use of print ink, laminate film, and other coating mixtures without lowering the film's transparency, slippage, or blocking resistance. These improvements are achieved by coating unstretched or uniaxially stretched non-heated polyamide film with a certain amount of coating mixture which includes a specified surface active agent, then stretching the film in at least one direction and heating it.

In other words, the present invention provides an easily adhesive polyamide film from unstretched or uniaxially stretched non-heated polyamide film through the following processes: coating the film with a water-base coating mixture, whose main constituents are A, B, and C as defined below, of which the solid-content weight ratio is (98-30)/(2-70)/(0.1-10) respectively; stretching the coated film in at least one direction; ensuring that the film's coating level after stretching is between 0.005 and 0.030 g/m$^2$, in terms of solid content; and heating the film.

A: water polyurethane resin containing acetylene glycol in which each carbon atom immediately adjacent to the triple-bonded carbon atom is substituted with a hydroxyl group and a methyl group, and/or an ethylene oxide addition product of the acetylene glycol.

B: water-soluble polyepoxy compound

C: particles with an average diameter of between 0.001 and 1.0 $\mu$m

The unstretched or uniaxially stretched non-heated polyamide film used in the present invention has a large number of free polar groups at the film surface which, in general, significantly affect adhesiveness. In addition, through the stretching and heating processes that follow the coating process, a significant amount of heat is added to the film, improving the adhesive strength between the polyamide film and the coated layer. Compared with off-line coating processes, which are performed after the stretching and heating processes, the newly invented method produces a film having stronger adhesiveness.

To improve adhesiveness, especially under moistened conditions, it is effective to maintain a water contact angle between 45 and 60° via, for example, corona discharge; for the strength of the corona discharge, 30 W ·min/m² or less is appropriate.

It is preferable to use a self-emulsion type of water polyurethane resin for the present invention because such resins have small-diameter particles and good stability. Particle diameter should be between 10 and 100 nm.

It is recommended that the glass transition point (Tg) of the water polyurethane resin used in the present invention be between 40 and 150° C. A water polyurethane resin with a Tg of less than 40° C. causes blocking when the film is rolled after coating; the remains of the blocking then cause transparent spots to form. In the worst case, it is not possible to rewind the roll, and the film may tear if the roll is forcibly rewound. Because this invention produces an in-line coating in which the polyamide film is stretched after being coated, if Tg is much higher than the temperature applied for drying and stretching after coating, it is difficult to coat the film evenly. Since the minimum film-forming temperature (MFT), which make continuous filming, is generally close to Tg. It is recommended that temperature be kept at less than 150° C.

In general, because the polyamide film used in the present invention will be printed, treated via vapor deposition, or laminated with other films, a wetting tension at the coating film surface between 40 and 52 dyn/cm is desirable. Using polycarbonate for the polyol that composes the polyurethane is suitable. A coating film of polyurethane obtained from polycarbonate polyol has a high wetting index, so treating the surface by corona discharge after forming the coating film is unnecessary.

The aqueous dispersion of polyurethane in the present invention contains a non-ionic surface active agent that is acetylene glycol in which each carbon atom immediately adjacent to the triple-bonded carbon atom is substituted with a hydroxyl group and methyl group, and/or an ethylene oxide addition product of the acetylene glycol. As such non-ionic surface active agent, Surfynols 104 and 440, produced by Nissan Chemical Industries, and so on are exemplified. It is desirable that adding ratio of the non-ionic surface active agent extends from 0.01% to 1.0% on the basis of the solid content in the aqueous dispersion of polyurethane.

Conventionally, due to the foaming caused when using a coating mixture and the strong surface tension of water, adding two kinds of surface active agents (i.e., a defoamant and a wetting solvent) to obtain a film having even "wetness" is required. Since the defoamant and wetting effects conflict in many cases, solving problems associated with the one can worsen the other, and visa versa. Defoamants with strong repellency, such as silicone defoamant, normally have excellent defoaming characteristics but poor wetting capability, cause fish eyes. This invention satisfies requirements for both defoaming and wetting performance by using acetylene glycol, in which two adjacent triple-bonded carbon atoms are replaced with a hydroxyl group and methyl group, and/or a non-ionic surface active agent, which is an addition product of the ethylene oxide. By adding this surface active agent, wetness at film surface is improved and since the film can be coated evenly using less of the coating mixture, production costs are reduced. Furthermore, the foaming-related problems which occur during mixing coating agent and application will be resolved thanks to the defoaming effect of the product.

The water-soluble polyepoxy compound (B) used in the invention dissolves in water and contains two or more epoxy groups. Certain examples are given below, but the water-soluble polyepoxy compound used in the invention is not limited to these examples.

Diepoxy compound obtained through etherealizing 1 mole of glycol, including ethylene glycol, diethylene glycol, triethylene glycol, polyethylene glycol, propylene glycol, dipropylene glycol, tripropylene glycol, polypropylene glycol, 1,4-butandiol, 1,6-hexandiol, and neopentyl glycol, and 2 moles of epichlorohydrin; polyepoxy compound obtained from etherizing a mole of polyhydric alcohol, such as glycerol, polyglycerol, trimethylo, propane, pentaerythritol, or sorbitol, and 2 or more moles of epichlorohydrin; and diepoxy compound obtained from etherizing a mole of dicarboxylic acid, such as phthalic acid, terephthalic acid, oxalic acid, or adipic acid, and 2 moles of epichlorohydrin.

These polyepoxy compounds cross-link with the water polyurethane resin, improve water resistance and solvent resistance, and contribute to adhesiveness with polyamide film.

The average diameter of the particles used in the invention is between 0.001 and 1.0 $\mu$m. It is best to use perfectly spherical particles. A "perfectly spherical" particle is one whose short-diameter to long-diameter ratio is at least 0.9, as viewed under electron microscopy. When the particles are perfectly spherical, blocking resistance and slippage is high, while transparency does not decrease significantly. Particles whose average diameter is less than 0.001 $\mu$m do not offer effective blocking resistance and slippage. Particles whose average diameter is over 1.0 $\mu$m act to reduce printability. Specifically, in the case of photo printing, pinholes form at highlighted areas. Suitably shaped particles can be either non-organic or organic; however, they must possess heat resistance to maintain effective blocking resistance and slippage and to avoid deformation during the manufacturing process.

These particles possess the same function as blocking resistance solvents and slippage solvents, which provide appropriate slippage during phases of post-processing such as rolling, printing, laminating, and coating. Among preferable particles, colloidal silica, "Snowtex" ST-C (average particle diameter: between 0.010 and 0.020 $\mu$m) or ST-XS (average particle diameter: between 0.004 and 0.006 $\mu$m) produced by Nissan Chemical Industries Co., Ltd. products are recommended; however, other particles may be used.

In this invention, the blending weight ratio A/B (A indicates a water polyurethane resin containing a surface active agent and B, a water-soluble polyepoxy compound) is between 98/2 and 30/70 (for solid content). If the ratio of A/B is larger than 98/2, the cross-linking density decreases, and water resistance, solvency, and adhesiveness decrease. By contrast, if the ratio of A/B is less than 30/70, blocking becomes a problem during the film seasoning.

The ratio of the blending amount of particle (C) to the total of water polyurethane resin (A) and water-soluble polyepoxy compound (B), or C/(A+B), should be between 0.1/100 and 10/100. If the ratio is less than 0.1/100, blocking resistance and slippage become insufficient; by contrast, ratios above 10/100 change neither blocking resistance nor slippage, and are not economically.

The coating amount of water-base coating mixture, whose main constituents are water polyurethane resin containing a surface interfacial active agent, a water-soluble polyepoxy compound and particles, is between 0.005 and 0.030 g/m² (dry weight) after the film is stretched; preferable results are between 0.010 and 0.025 g/m² yield. If the amount is less than 0.005 g/m², it is not possible to coat the film evenly, and the film's water resistance and adhesiveness will be insufficient. By contrast, if coated with more than 0.030 g/m², blocking is likely to occur between the film's coated and non-coated surfaces. Use of excess coating is not recommended because this practice raises costs but not performance.

It is possible to use the existing coater head when coating polyamide film. For example, a gravure coater, squeeze coater, bar coater, kiss roll coater, or reverse roll coater can be used.

To prevent the forming of water polyurethane resin used in this invention, or to improve the coating mixture's wetness at the film surface, it is permissible to add alcohol to the resin. However, because water polyurethane resin may gel when excessive alcohol is added, it is essential to determine the appropriate amount to add through testing.

MODE FOR CARRYING OUT THE CLAIMED INVENTION

The following embodiment provides a detailed description of the present invention; however, the invention is not limited to the following method. Embodiment methods are evaluated as follows:

1. Tg

Measuring Apparatus: dynamic viscoelasticity measuring apparatus, VES-F3 produced by Iwamoto Manufacturing 2. Wetting Tension Wetting tension at the coating surface according to JIS K 6768

3. Blocking Resistance

Coated samples were underlapped so that their coated surface and non-coated surface faced each other, and then a load of 10 kg was added to an area of 25 mm×25 mm for 48 hours at a temperature of 40° C. After temperature was reduced to room temperature, the samples were sheared and peeled at a speed of 100 mm/min using the tensile test equipment, and maximum strength was measured.

4. Printability

Determined using photogravure ink, "NEW LP Super" R162 Red from Toyo Ink MFG. Co., Ltd. which was adjusted to a viscosity of 20 seconds using a No. 3 Zahn cup viscometer. Ink was printed on the coated surface using a gravure cylinder, formed by a conventional method. Depths of 5 $\mu$m, 15 $\mu$m, 22 $\mu$m, and 36 $\mu$m for the 175-line were used, and pinhole position was evaluated as follows:

Grade 1: No pinholes

Grade 2: Pinholes were found at the 5 $\mu$m area.

Grade 3: Pinholes were found at the 15 $\mu$m area.

Grade 4: Pinholes were found at the 22 $\mu$m area.

Grade 5: Pinholes were found at the 36 $\mu$m area.

5. Laminate Intensity

The test surface (non-printed and printed surfaces) and a 40 $\mu$m-thick LLDPE (Kohijin L-Ace, type H) surface treated by corona discharge were coated with adhesive for dry laminates E-285B/C-75N produced by Dainichiseika Color & Chemicals Manufacturing, Co, Ltd, at 3.5 g/m² solid-content conversion. After dry-laminating both surfaces, sample laminate was seasoned for 48 hours at a temperature of 40° C. Dry-laminated surfaces were sampled as a width of 15 mm, with intensity measured while peeling the laminate at a speed of 100 mm/min using the tensile test equipment. When the sample was wet after boiling, intensity was measured by adding water to the peeled area.

6. Heat Sealing Intensity

A laminate sample was created following the same process as in the laminate intensity evaluation and a heat-sealing sample was created by underlapping the LLDPE surfaces to face each other. Both types of samples had a width of 15 mm, and maximum intensity was measured while separating the laminate at a speed of 300 mm/min using the tensile test equipment. When the sample was wet after boiling, intensity was measured by adding water at the sealed area.

COMPARATIVE EXAMPLE 1

After the melting extrusion of 6 nylon resins with a relative viscosity of 3.5 from a ring die, a tube shaped film 150 $\mu$m thick was obtained by cooling at the internal and external water cooling mandrel. The said tube-shaped film was biaxially stretched toward MD and TD simultaneously, by using the speed difference between the low-speed nip roll and the high-speed nip roll, and the air pressure existing between these different rolls. The tube was folded, heated for 10 seconds at a temperature of 210° C. in a tenter oven to obtain a 15 $\mu$m-thick film, both edges of which were cut to create a flat film which was treated on one side with corona discharge and compacted into two rolls.

The laminate intensity and the heat sealing intensity of the surface treated by corona discharge were measured. As shown in Table 2, the adhesive strength of the film was notably poor relative to the in-line coating film.

COMPARATIVE EXAMPLE 2 and 3

From a ring die, after the melting extrusion of 6 nylon resins with a relative viscosity of 3.5 from a tube-shaped film of 150 $\mu$m thick was obtained by cooling at the internal and external water cooling mandrel. Self-emulsion polyurethane resin "Takelac" XW-74-X39 (Tg 110° C.) produced by Takeda Chemical Industroes, water-soluble polyepoxy compound "Denacol" EX-521 (polyglycerol polyglycidyl ether) produced by Nagase chemicals, and colloidal silica "Snowtex" ST-C (average diameter: 10 to 20 nm) produced by Nissan Chemical Industries were combined at a blending ratio of 70/30/5, and a water-base coating mixture obtained by diluting with water was applied by in-line using 0.01 and 0.02 g/m² of coating after the film was stretched by a dip coater. The film was then dried. The said tube-shaped film was then biaxially stretched toward MD and TD simultaneously, using the speed difference caused between the low-speed nip roll and the high-speed nip roll, and the air pressure existing between these different speeds. The tube was folded, heated for 10 seconds at a temperature of 210° C. in a tenter oven to obtain a 15 $\mu$m-thick film, and both its edges tube were cut to create a flat film, and rolled into two rolls.

The characteristics of the film were evaluated. As shown in Tables 1 and 2, both printability and adhesive strength were poor.

Embodiments 1 and 2

The characteristics of a film obtained in the same manner as in Comparative Examples 2 and 3 were evaluated, except that "Surfynol 440" produced by Nissin Chemical Industry Co.,Ltd. was added into the water-base coating mixture at 0.1% of XW-74-X39 (solid content). As shown in Table 1, printability and blocking resistance were outstanding. Also, as shown in Table 2, adhesive strength was excellent.

COMPARATIVE 4

The characteristics of a film obtained in the same manner as Comparative Example 3 except that silicone defoamant TSA772 produced by Toshiba Silicone was added into the water-based coating mixture at 0.1% of XW-74-X39 (solid content) were evaluated. The wetting tension of the film was rather low, and its printability was poor. Also, the adhesive strength was inferior to the results achieved for Embodiments 1 and 2.

COMPARATIVE EXAMPLE 5

The characteristics of a film obtained in the same manner as Comparative Example 3 except that Emulgen 911 produced by Kao Corporation's (non-ionic surface active agent and polyoxyethylene nonyl phenyl ether) was added into the water-based coating mixture at 0.1% of XW-74-X39 (solid content) were evaluated. The film presented partially repellent characteristics due to the foam created during coating, and yielded a lower wetting tension and poor printability. Also, adhesive strength was inferior to the films produced in Embodiments 1 and 2.

COMPARATIVE EXAMPLE 6

The characteristics of a film obtained in the same manner as Embodiment 1, except that the amount of water-based coating mixture used in Embodiment 1 was changed were evaluated. Because less coating was used, the film was not evenly coated, and its adhesive strength was inferior to the films produced in Embodiments 1 and 2. Its wetting index was rather low, and printability was poor.

COMPARATIVE EXAMPLE 7

The characteristics of a film obtained in the same manner as Embodiment 2, except that the particles used in Embodiment 2 were not blended were evaluated. As in Table 1, blocking resistance was poor, and printability was rather poor.

COMPARATIVE EXAMPLE 8

The characteristics of a film obtained in the same manner as Embodiment 1, except that the amount of the water-based coating mixture used in Embodiment 1 was changed were evaluated. While adhesive strength and printability were good, blocking resistance was inferior to films produced in Embodiments 1 and 2.

INDUSTRIAL USABILITY

As explained above, the easily adhesive polyamide film of this were evaluated offers high blocking resistance as well as strong adhesiveness with print ink, laminate, and other coating mixtures. Furthermore, the in-line coating process employed keeps production costs low, the use of a water-based coating mixture provides safety, and the addition of a surface active agent with defoaming characteristics creates an evenly coated film which experiences no problems during the coating process, and the highly adhesive film is easily obtained using small amounts of coating mixture. Given these advantages, it is particularly suited for boiling sterilization, retort sterilization, and packaging of liquids.

TABLE 1

|  | Amount of surface active agent added (%) | Amount of coating mixture (g/m$^2$) | Wetting tension at the coating surface (dyn/cm) | Blocking resistance (Kg/625 mm$^2$) | Printability |
|---|---|---|---|---|---|
| Comparative Example 1 | — | — | 54 *1 | — | Grade 1 |
| Comparative Example 2 | None | 0.01 | 46 | 2.5 | Grade 2 |
| Comparative Example 3 | None | 0.02 | 46 | 2.4 | Grade 2 |
| Embodiment 1 | S-440 *2 0.1 | 0.01 | 46 | 2.4 | Grade 1 |
| Embodiment 2 | S-440 0.1 | 0.02 | 46 | 2.5 | Grade 1 |
| Comparative Example 4 | TSA772 0.1 | 0.02 | 43 | 2.4 | Grade 2 |
| Comparative Example 5 | E-911 *3 0.1 | 0.02 | 44 | 2.4 | Grade 3 |
| Comparative Example 6 | S-440 0.1 | 0.001 | 41 | 2.0 | Grade 3 |
| Comparative Example 7 | S-440 0.1 | 0.02 | 46 | 5.8 | Grade 2 |
| Comparative Example 8 | S-440 0.1 | 0.05 | 46 | 4.0 | Grade 1 |

*1 Wetting tension at the surface treated by corona discharge
*2 Surfynol 440
*3 Emulgen 911

TABLE 2

|  | Laminate intensity (g/15 mm-width) | | | Heat sealing intensity (Kg/15 mm width) | | |
|---|---|---|---|---|---|---|
|  | Ordinary state | Wetted after boiling *4 | | Ordinary state | Wetted after boiling *4 | |
|  | Non-printed | Non-printed | Printed | Non-printed | Non-printed | Printed |
| Comparative Example 1 | 780 | 180 | 210 | 5.7 | 4.1 | 3.3 |
| Comparative Example 2 | 900 | 200 | 200 | 5.7 | 4.3 | 3.8 |
| Comparative Example 3 | 970 | 240 | 230 | 5.9 | 4.5 | 3.9 |
| Embodiment 1 | 1200 | Ny cut *5 | I/I *6 | 6.2 | 5.0 | 4.4 |
| Embodiment 2 | 1200 | Ny cut *5 | I/I *6 | 6.3 | 5.2 | 4.5 |
| Comparative Example 4 | 940 | 200 | 190 | 6.1 | 4.2 | 3.8 |
| Comparative Example 5 | 950 | 200 | 200 | 6.2 | 4.0 | 3.9 |
| Comparative Example 6 | 970 | 150 | 200 | 5.9 | 4.0 | 3.5 |
| Comparative Example 7 | 1200 | Ny cut *5 | I/I *6 | 6.3 | 5.2 | 4.5 |
| Comparative Example 8 | 1030 | Ny cut *5 | I/I *6 | 6.4 | 5.2 | 4.5 |

*4 Condition of Boiling treatment: 30 minutes at a temperature of 100° C.
*5 The cut of nylon film (peak value: approximately 450 g/15 mm).
*6 Cohesive failure in the part of the ink (peak value: approximately 420 g/15 mm).

What is claimed is:

1. A polyamide film that adheres easily, comprising:
    a water-based coating mixture with a solid weight ratio of main components A/B/C=98~30/2~70/0.1~10;
    wherein component A of the coating mixture is an aqueous dispersion of polyurethane containing a non-ionic surface agent that is:
        acetylene glycol in which each carbon atom immediately adjacent to a triple-bonded carbon atom is substituted with a hydroxyl group and a methyl group, and/or an ethylene oxide addition product of said acetylene glycol; and wherein the polyurethane has a glass transition-temperature between 40° C. and 150° C.;

wherein component B of the coating mixture is a water-soluble polyepoxy compound;

wherein component C of the coating mixture comprises particles with an average particle diameter between 0.001 and 1.0 $\mu$m;

wherein the coating mixture is present in an amount between 0.005 and 0.030 g/m$^2$, based on dry weight;

wherein the polyamide film is either unstretched or is uniaxially stretched and non-heated before being coated with the coating mixture; and wherein after being coated with the coating mixture, the polyamide film is stretched in at least one direction and heated.

2. The polyamide film as described in claim 1, wherein the non-ionic surface active agent is contained at a content of 0.01–1.0%, based on the solid content of the aqueous dispersion of polyurethane.

3. The polyamide film described in claim 2, coated with between 0.010 and 0.025 g/m$^2$ of coating mixture, based on dry weight.

4. A laminate comprising the polyamide film of claim 2.

5. The polyamide film as described in claim 1, wherein the film is coated with between 0.010 and 0.025 g/m$^2$ of coating mixture, based on dry weight.

6. A laminate comprising the polyamide film of claim 5.

7. A laminate comprising the polyamide film of claim 1.

* * * * *